United States Patent
Lu et al.

(10) Patent No.: US 10,737,521 B2
(45) Date of Patent: Aug. 11, 2020

(54) METHOD FOR INKJET PRINTING GLASS TO HAVE A METALLIC APPEARANCE BY INKJET PROCESS

(71) Applicant: 3MACJET TECHNOLOGY CO., LTD., Tainan (TW)

(72) Inventors: Yung-Hsien Lu, Tainan (TW); Ruei-Ming Huang, Tainan (TW)

(73) Assignee: 3MACJET Techonology Co., Ltd., Tainan (TW)

( * ) Notice: Subject to any disclaimer, the term of this patent is extended or adjusted under 35 U.S.C. 154(b) by 0 days.

(21) Appl. No.: 16/125,942

(22) Filed: Sep. 10, 2018

(65) Prior Publication Data

US 2020/0079131 A1   Mar. 12, 2020

(51) Int. Cl.
| | | |
|---|---|---|
| *B41J 2/01* | (2006.01) | |
| *B41M 7/00* | (2006.01) | |
| *B41M 5/00* | (2006.01) | |
| *B41J 11/00* | (2006.01) | |

(52) U.S. Cl.
CPC ........ *B41M 7/0036* (2013.01); *B41J 11/0015* (2013.01); *B41M 5/007* (2013.01); *B41M 5/0047* (2013.01)

(58) Field of Classification Search
None
See application file for complete search history.

(56) References Cited

U.S. PATENT DOCUMENTS

| | | | | |
|---|---|---|---|---|
| 5,989,757 | A * | 11/1999 | Satoi | B41J 2/01 347/102 |
| 2014/0302290 | A1* | 10/2014 | Takekoshi | B41M 5/0047 428/204 |
| 2017/0073445 | A1* | 3/2017 | Hiraoka | C08F 220/18 |
| 2017/0087910 | A1* | 3/2017 | Nagashima | B41J 2/01 |
| 2017/0275466 | A1* | 9/2017 | Endert | B41M 5/0023 |

\* cited by examiner

*Primary Examiner* — Matthew Luu
*Assistant Examiner* — Tracey M McMillion
(74) *Attorney, Agent, or Firm* — Rosenberg, Klein & Lee

(57) ABSTRACT

A method for inkjet printing glass to have a metallic appearance by an inkjet process is disclosed herein. It comprises the following steps of cleaning and drying a glass to be inkjet printed; inkjet printing an ink bottom layer on a surface of the glass and a metallic ink layer on the ink bottom layer; and inkjet printing a transparent protective ink layer on the metallic ink layer.

14 Claims, 1 Drawing Sheet

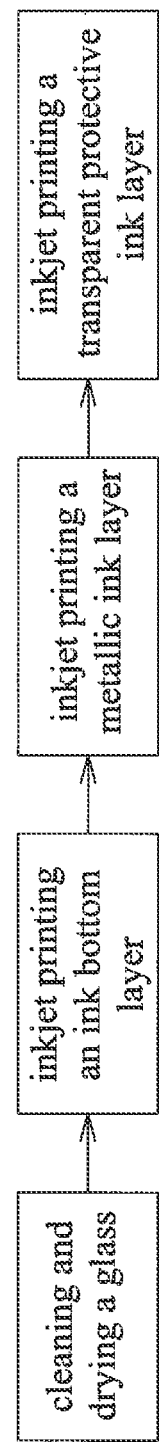

METHOD FOR INKJET PRINTING GLASS TO HAVE A METALLIC APPEARANCE BY INKJET PROCESS

BACKGROUND OF THE INVENTION

1. Field of the Invention

The present invention relates to a method for inkjet printing glass to have a metallic appearance by an inkjet process which has effects of rapid surface treatment, diversification, full color and gradation, and saving cost and time of plate-making required for the general printing process by reducing the use of ink, so as to achieve environmental protection, meet the relevant performance tests of electronics products, improve the field of application, and increase the practicality and efficiency in its overall application.

2. Description of Related Art

Currently, the development of smart phones has entered a mature stage, so the functions of different brands of smart phones are almost identical. In such a case, the willingness to drive consumers to buy new phones depends on whether the appearance of the phone is eye-catching. Since the palm of the human body has an inward curvature, the curved structure of the mobile phone with the 3D curved back shell is just ergonomic, and the curved edge of the touch function can greatly enhance the consumer's grip feeling, which are gradually and widely used in smart phones. With the popularity of 3D curved surface design in smart phones, related industries also focused on enhancing its surface decoration and performance.

Furthermore, plastic casing material is considered by the consumer to be relatively low-grade. As a result, superhard materials such as metals, glass and ceramics are more recognized by smartphone manufacturers. With the use of new communication technologies and the application of wireless charging technology, the shielding effect of metal casings has become an intractable problem. Glass has light, transparent and clean features and well processing formability, so glass materials have gradually replaced other materials as a casing. However, changing the casing from other materials to glass materials is not easy for the industry's production capacity. Integrating the decorative glass surface content into the design language of the entire smart phone is also important. Additionally, it is well known that carrying out a decorative pattern processing on the glass surface is difficult, and the printing process on the 3D glass curved surface is more difficult. Therefore, the maturity and productivity of the 3D glass curved printing process of the cover-plate processing plant become one of the important evaluation projects for mobile phone manufacturers.

Generally, the conventional printing is applied to a surface treatment of flat objects, when applied to the surface treatment of a 3D glass curved surface, it is necessary to perform multiple printings. Therefore, the conventional printing technique not only takes a long time to print, but also affects the appearance and wastes the paint due to the joint seam. Some manufacturers use vacuum coating to perform surface treatment of 3D glass curved surfaces. However, the vacuum coating method has the disadvantages of slow speed, high coating cost and increased thickness of the coating film. The thick coating film affects the heat dissipation of the mobile phone to some extent, so the vacuum coating cannot be applied to the mass production of the 3D glass curved surface.

SUMMARY OF THE INVENTION

In view of the above-mentioned problems, the object of the present invention is to provide a method for inkjet printing glass to have a metallic appearance by an inkjet process which has effects of rapid surface treatment, diversification, full color and gradation, and saving cost and time of plate-making required for the general printing process by reducing the use of ink, so as to achieve environmental protection, meet the relevant performance tests of electronics products, improve the field of application, and increase the practicality and efficiency in its overall application.

The method for inkjet printing glass to have a metallic appearance by an inkjet process comprises:

A. cleaning and drying a glass to be inkjet printed;

B. inkjet printing an ink bottom layer on a surface of the glass;

C. inkjet printing a metallic ink layer on the ink bottom layer after the ink bottom layer is dried; and D. inkjet printing a transparent protective ink layer on the metallic ink layer after the metallic ink layer is dried.

According to an embodiment of the present invention, the ink bottom layer is formed by printing ink dots on the surface of the glass and a color depth thereof is changed by adjusting a printing density of the ink dots.

According to an embodiment of the present invention, the ink bottom layer exhibits a gradation by adjusting the printing density of the ink dots.

According to an embodiment of the present invention, the ink bottom layer contains 0.1-4.0% by weight of a pigment, 2.0-4.0% by weight of a dispersant, 5.0-25.0% by weight of a resin and the remaining weight percent of a solvent.

According to an embodiment of the present invention, the ink bottom layer is further added with 0.5-3.5% by weight of an additive.

According to an embodiment of the present invention, the metallic ink layer contains 1.0-5.0% by weight of nano-silver particles, 0.1-3.0% by weight of a dispersant, 0.1-15.0% by weight of a resin and the remaining weight percent of a solvent.

According to an embodiment of the present invention, the metallic ink layer contains 0.5-1.5% by weight of nano-aluminum particles, 0.1-2.0% by weight of a dispersant, 0.1-15.0% by weight of a resin and the remaining weight percent of a solvent.

According to an embodiment of the present invention, the metallic ink layer is further added with 0.1-5.0% by weight of an additive.

According to an embodiment of the present invention, the transparent protective ink layer contains 5.0-30.0% by weight of a resin and 70.0-95.0% by weight of a solvent.

According to an embodiment of the present invention, the transparent protective ink layer is further added with 0.1-5.0% by weight of an additive.

BRIEF DESCRIPTION OF THE DRAWINGS

The FIGURE is a flow chart showing a method for inkjet printing glass to have a metallic appearance by an inkjet process according to the present invention.

DETAILED DESCRIPTION OF THE PREFERRED EMBODIMENT

Hereinafter, an exemplary embodiment of the present invention will be described in detail with reference to the accompanying drawing.

As showed in the FIG., a method for inkjet printing glass to have a metallic appearance by an inkjet process comprises the steps of:

A. cleaning and drying a glass to be inkjet printed;
B. inkjet printing an ink bottom layer on a surface of the glass;
C. inkjet printing a metallic ink layer on the ink bottom layer after the ink bottom layer is dried; and
D. inkjet printing a transparent protective ink layer on the metallic ink layer after the metallic ink layer is dried.

The ink bottom layer of the step B contains 0.1-4.0% by weight of a pigment, 2.0-4.0% by weight of a dispersant, 5.0-25.0% by weight of a resin and the remaining weight percent (e.g. 72.9-92.9%) of a solvent. The ink bottom layer is further added with 0.5-3.5% by weight of an additive. The pigment is cyan, magenta, yellow, or black pigment or the combination thereof, which is ejected by an end of an inkjet printer. The ink bottom layer is formed by printing ink dots on the surface of the glass and its color depth can be changed by adjusting a printing density of the ink dots. Furthermore, the ink bottom layer exhibits a gradation by adjusting the printing density of the ink dots.

The metallic ink layer of the step C contains nano-silver particles or nano-aluminum particles, a dispersant, a resin, a solvent and an additive. Specifically, the metallic ink layer of the step C contains 1.0-5.0% by weight of nano-silver particles, 0.1-3.0% by weight of a dispersant, 0.1-15.0% by weight of a resin and the remaining weight percent (e.g. 83.9-98.8%) of a solvent. The metallic ink layer is further added with 0.1-5.0% by weight of an additive. In order to achieve the glossy effect of aluminum, the metallic ink layer contains 0.5-1.5% by weight of nano-aluminum particles, 0.1-2.0% by weight of a dispersant, 0.1-15.0% by weight of a resin and the remaining weight percent (e.g. 84.4-99.3%) of a solvent, and the metallic ink layer can be selectively added with 0.1-5.0% by weight of an additive.

The transparent protective ink layer of the step D contains 5.0-30.0% by weight of a resin and 70.0-95.0% by weight of a solvent, and the transparent protective ink layer can be selectively added with 0.1-5.0% by weight of an additive.

The dispersant of the ink bottom layer and the metallic ink layer is selected from a group of an acrylic copolymer, a copolymer containing pigment affinity groups, a polymer of polyamine and polyamide, an alkanolamine of copolymerized vinegar containing acidic pigment affinity groups, a high molecular weight copolymer of phosphate ester, and hydrocarbyl carboxylate ester.

The resin of the ink bottom layer, the metallic ink layer and the transparent protective ink layer is an organic resin, an inorganic resin or a mixed resin of the two.

The solvent of the ink bottom layer, the metallic ink layer and the transparent protective ink layer is selected from a group of alcohols, polyols, alcohol ethers and alcohol ether esters. The alcohols comprises ethanol, isopropyl alcohol, n-butyl alcohol, isobutyl alcohol, 3-methoxy-3-methyl-1-butanol and the like. The polyols comprises ethylene glycol, 1,2-peropanediol, 1,3-propanediol, glycerol, 2-ethyl-2-(hydroxymethyl)-1,3-propanediol, 2-butyl-2-ethyl-1,3-propanediol, 2,2-dimethylpropane-1,3-diol, 1,2-butylene glycol, 1,3-butylene glycol, 2,3-butylene glycol, 2,2-dimethyl-1,3-propanediol, 1,5-pentanediol, 2-methyl-1,4-pentadiene, 2,4-diethyl-2,4-pentanediol, 2-butene-1,4-diol, 2,5-hexanediol, 2,5-dimethylhexane-2,5-diol, 2-ethyl-1,3-hexanediol and the like. The alcohol ethers comprises ethylene glycol dimethyl ether, tetraethylene glycol dimethyl ether, dipropylene glycol dimethyl ether, diethylene glycol dibutyl ether, diethylene glycol monobutyl ether, diethylene glycol dimethyl ether, ethylene glycol diethyl ether, diethylene glycol diethyl ether, diethylene glycol methyl ethyl ether, propylene glycol dimethyl ether, triethylene glycol dimethyl ether, ethylene glycol tertiary butyl ether, ethylene glycol monobutyl ether, propylene glycol tertiary butyl ether, diethylene glycol tertiary butyl ether, propylene glycol monomethyl ether, propylene glycol methyl propylene ether, propylene glycol methyl butyl ether, dipropylene glycol methyl butyl ether, dipropylene glycol methyl propylene ether and the like. The alcohol ether esters comprises ethylene glycol monoethyl ether acetate, diethylene glycol monobutyl ether acetate, diethylene glycol monoethyl ether acetate, propylene glycol methyl ether acetate, dipropylene glycol methyl ether acetate, ethylene glycol monobutyl ether acetate and the like.

The additive of the ink bottom layer, the metallic ink layer and the transparent protective ink layer is a leveling agent, an antifoaming agent, and the like.

The leveling agent is mainly a polydimethyl siloxane solution, a polyether polyester modified organic siloxane solution, an alkyl modified organic siloxane solution, an acrylate copolymer, a polyacrylic vinegar solution, and an OH-containing polyacrylic vinegar copolymer solution, and the like. The antifoaming agent is mainly polydimethyl siloxane, modified polydimethyl siloxane, and the like.

Accordingly, the glass has a surface treatment by inkjet printing the ink bottom layer and the metallic ink layer, and the inkjet printing of the transparent protective ink layer has a protective effect on the ink bottom layer and the metallic ink layer so that the glass surface exhibits a metallic appearance.

Compared with the technique available now, the present invention has the following advantages:

1. The present invention conducts a surface treatment to the glass by inkjet printing so that the appearance of the glass has metallic texture.
2. The present invention not only performs the surface treatment more rapidly to achieve the effects of diversification, full color and gradation and save the costs and time of plate-making required for the general printing process but also reduces the use of ink due to that the ink bottom layer, the metallic ink layer and the transparent protective ink layer are thinner after printing.
3. The present invention is environmentally friendly. Furthermore, the combination of such coatings of the present invention meet the relevant performance tests of electronic products after they are baked, which improves the field of application and increases the practicality and efficiency in its overall application.

What is claimed is:

1. A method for inkjet printing glass to have a metallic appearance by an inkjet process, comprising:
    cleaning and drying a glass to be inkjet printed;
    inkjet printing an ink bottom layer on a surface of the glass, the ink bottom layer containing 0.1-4.0% by weight of a pigment, 2.0-4.0% by weight of a dispersant, 5.0-25.0% by weight of a resin, and the remaining weight percent of a solvent;
    inkjet printing a metallic ink layer on the ink bottom layer after the ink bottom layer is dried, the metallic ink layer containing 1.0-5.0% by weight of nano-silver particles, 0.1-3.0% by weight of a dispersant, 0.1-15.0% by weight of a resin, and the remaining weight percent of a solvent; and inkjet printing a transparent protective ink layer on the metallic ink layer after the metallic ink layer is dried.

2. The method for inkjet printing glass to have a metallic appearance by an inkjet process as claimed in claim 1, wherein the ink bottom layer is formed by printing ink dots on the surface of the glass and a color depth thereof is changed by adjusting a printing density of the ink dots.

3. The method for inkjet printing glass to have a metallic appearance by an inkjet process as claimed in claim 2, wherein the ink bottom layer exhibits a gradation by adjusting the printing density of the ink dots.

4. The method for inkjet printing glass to have a metallic appearance by an inkjet process as claimed in claim 1, wherein the ink bottom layer is further added with 0.5-3.5% by weight of an additive.

5. The method for inkjet printing glass to have a metallic appearance by an inkjet process as claimed in claim 1, wherein the metallic ink layer is further added with 0.1-5.0% by weight of an additive.

6. The method for inkjet printing glass to have a metallic appearance by an inkjet process as claimed in claim 1, wherein the transparent protective ink layer contains 5.0-30.0% by weight of a resin and 70.0-95.0% by weight of a solvent.

7. The method for inkjet printing glass to have a metallic appearance by an inkjet process as claimed in claim 6, wherein the transparent protective ink layer is further added with 0.1-5.0% by weight of an additive.

8. A method for inkjet printing glass to have a metallic appearance by an inkjet process, comprising:
cleaning and drying a glass to be inkjet printed;
inkjet printing an ink bottom layer on a surface of the glass;
inkjet printing a metallic ink layer on the ink bottom layer after the ink bottom layer is dried, the metallic ink layer containing 1.0-5.0% by weight of nano-silver particles, 0.1-3.0% by weight of a dispersant, 0.1-15.0% by weight of a resin, and the remaining weight percent of a solvent; and
inkjet printing a transparent protective ink layer on the metallic ink layer after the metallic ink layer is dried.

9. The method for inkjet printing glass to have a metallic appearance by an inkjet process as claimed in claim 8, wherein the metallic ink layer is further added with 0.1-5.0% by weight of an additive.

10. A method for inkjet printing glass to have a metallic appearance by an inkjet process, comprising:
cleaning and drying a glass to be inkjet printed;
inkjet printing an ink bottom layer on a surface of the glass;
inkjet printing a metallic ink layer on the ink bottom layer after the ink bottom layer is dried, the metallic ink layer containing 0.5-1.5% by weight of nano-aluminum particles, 0.1-2.0% by weight of a dispersant, 0.1-15.0% by weight of a resin, and the remaining weight percent of a solvent; and
inkjet printing a transparent protective ink layer on the metallic ink layer after the metallic ink layer is dried.

11. The method for inkjet printing glass to have a metallic appearance by an inkjet process as claimed in claim 10, wherein the metallic ink layer is further added with 0.1-5.0% by weight of an additive.

12. A method for inkjet printing glass to have a metallic appearance by an inkjet process, comprising:
cleaning and drying a glass to be inkjet printed;
inkjet printing an ink bottom layer on a surface of the glass, the ink bottom layer containing 0.1-4.0% by weight of a pigment, 2.0-4.0% by weight of a dispersant, 5.0-25.0% by weight of a resin, and the remaining weight percent of a solvent;
inkjet printing a metallic ink layer on the ink bottom layer after the ink bottom layer is dried, wherein the metallic ink layer contains 0.5-1.5% by weight of nano-aluminum particles, 0.1-2.0% by weight of a dispersant, 0.1-15.0% by weight of a resin, and the remaining weight percent of a solvent; and
inkjet printing a transparent protective ink layer on the metallic ink layer after the metallic ink layer is dried.

13. The method for inkjet printing glass to have a metallic appearance by an inkjet process as claimed in claim 12, wherein the metallic ink layer is further added with 0.1-5.0% by weight of an additive.

14. A method for inkjet printing glass to have a metallic appearance by an inkjet process, comprising:
cleaning and drying a glass to be inkjet printed;
inkjet printing an ink bottom layer on a surface of the glass, the ink bottom layer containing 0.1-4.0% by weight of a pigment, 2.0-4.0% by weight of a dispersant, 5.0-25.0% by weight of a resin, and the remaining weight percent of a solvent;
inkjet printing a metallic ink layer on the ink bottom layer after the ink bottom layer is dried; and
inkjet printing a transparent protective ink layer on the metallic ink layer after the metallic ink layer is dried, the transparent protective ink layer containing 5.0-30.0% by weight of a resin and 70.0-95.0% by weight of a solvent, wherein the transparent protective ink layer is further added with 0.1-5.0% by weight of an additive.

* * * * *